United States Patent [19]

Yamahara

[11] Patent Number: 4,465,297
[45] Date of Patent: Aug. 14, 1984

[54] VEHICLE HEIGHT CONTROL APPARATUS

[75] Inventor: Shinichi Yamahara, Obu, Japan

[73] Assignee: Aisin Seiki Kabushiki Kaisha, Kariya, Japan

[21] Appl. No.: 424,593

[22] Filed: Sep. 27, 1982

[30] Foreign Application Priority Data

Dec. 17, 1981 [JP] Japan ............................ 56-202531

[51] Int. Cl.$^3$ .......................................... B60G 11/26
[52] U.S. Cl. ................................... 280/711; 417/278
[58] Field of Search ................ 280/711, 713; 417/278, 417/290

[56] References Cited

U.S. PATENT DOCUMENTS

| 3,667,775 | 6/1972 | Whelan | 280/712 |
| 3,784,220 | 1/1974 | Wanner | 280/711 |
| 4,149,827 | 4/1979 | Hofmann, Jr. | 417/290 |
| 4,249,866 | 2/1981 | Shaw et al. | 417/290 |
| 4,327,936 | 5/1982 | Sekiguchi | 280/711 |

Primary Examiner—Joseph F. Peters, Jr.
Assistant Examiner—Kenneth R. Rice
Attorney, Agent, or Firm—Burns, Doane, Swecker & Mathis

[57] ABSTRACT

A vehicle height control apparatus including a compressor, a drier for drying the compressed air from the compressor and absorbers telescopically extendable and retractable by introducing or discharging compressed air for charging the height of a vehicle. The residual compressed air in the drier is released to the atmosphere by means of a control unit after the compressor has stopped. The starting load on the compressor is thus mitigated.

11 Claims, 2 Drawing Figures

VEHICLE HEIGHT CONTROL APPARATUS

FIELD OF THE INVENTION

The present invention relates to an apparatus for controlling the height of a vehicle, particularly to an apparatus for controlling the vehicle height in which the starting load on a compressor is mitigated.

In general the vehicle height control apparatus includes a plurality of shock absorbers having pneumatic springs which can be extended and retracted by introducing and discharging the compressed air respectively. A drier which comprises for example a cylindrical enclosure in which drying agent is optionally charged is conventionally provided between the compressor and the absorbers for removing the moisture from the compressed air to be supplied to the absorbers. The conventional vehicle height control apparatus requires a high starting load on the compressor since the compressed air remains in the drier when the compressor starts again. Furthermore, the compressor is frequently turned off or on. Therefore, the vehicle height control apparatus has disadvantages such that the power consumption is high and the motor for the compressor should be designed to have a high horse power.

OBJECT AND SUMMARY OF THE INVENTION

Accordingly, it is an object of the present invention to provide a novel vehicle height control apparatus.

It is another object of the present invention to provide a vehicle height control apparatus in which the starting load on the compressor is mitigated.

It is a further object of the present invention to provide a vehicle height control apparatus which is small in size as well as light in weight.

It is a further object of the present invention to provide a vehicle height control apparatus having a low power consumption.

It is a further object of the present invention to provide a vehicle height control apparatus which may smoothly and gradually lower the vehicle height.

Other objects of the present invention will become apparent in the entire disclosure.

In an aspect of the present invention, there is provided an apparatus for controlling the height of a vehicle including a compressor for compressing air; a drier communicated with the compressor for drying the compressed air and pneumatically springed shock absorbers communicated with the drier via valve means, said shock absorbers being adapted to change the height of the vehicle by introducing and discharging the compressed air in and from the shock absorbers, said controlling apparatus including:

(a) first valve means disposed in an exhaust passage communicating the drier with the atmosphere for opening and closing the exhaust passage;
(b) second valve means disposed in a passage communicating the absorber(s) with the drier for opening and closing the passage;
(c) sensor means for detecting the height of the vehicle;
(d) a control circuit connected to the output of the sensor means for selectively operating the compressor, the first and second valve means in response to the signals from the sensor means, said control circuit including a vehicle height discriminating circuit providing an output signal for opening or closing the respective first and second valve means and for controlling the compressor in relation to the signal from the sensor means relating to the relative vehicle height with respect to a predetermined height and a circuit sensing the recovery of the height from a low height to the predetermined height to provide a signal for opening the first valve means for a predetermined period of time.

The control circuit includes the height discriminating circuit having a plurality of output terminals at which different combination of logic state signals are provided depending upon the output signal from the vehicle height sensor; a circuit coupled to one of the output terminals of the discriminating circuit for sensing the recovery of the height from a low height to a predetermined height. The output signals from the output terminals of the height discriminating circuit and the recovery sensing circuit are applied to a logic circuit controlling the first and second valves and the compressor. The height of the vehicle is maintained constant by the selective operation of the first and second valves and the compressor. The starting load on the compressor is mitigated as follows: The residual compressed air in the drier is released to the atmosphere through the first exhaust valve controlled by the recovery sensing circuit after the compressor has stopped while the second valve is closed. Accordingly the compressor may be made small in size and operated by less power. The recovery sensing circuit is formed of a timed pulse generator providing a signal for a given period of time after sensing the recovery.

In another aspect of the present invention, there is provided an orifice in a passage between the drier and the shock absorbers to restrict the flow of the compressed air. The inner diameter of the orifice is so adjusted that the compressed air may be gradually discharged from the absorber and steep lowering of the vehicle height may be avoided.

In the following the present invention will be disclosed with reference to a preferred embodiment illustrated in the Drawings, which, however, serve to a better illustration of the invention and not to limitation thereof.

DETAILED DESCRIPTION OF THE PREFERRED EMBODIMENTS

Figure 1:
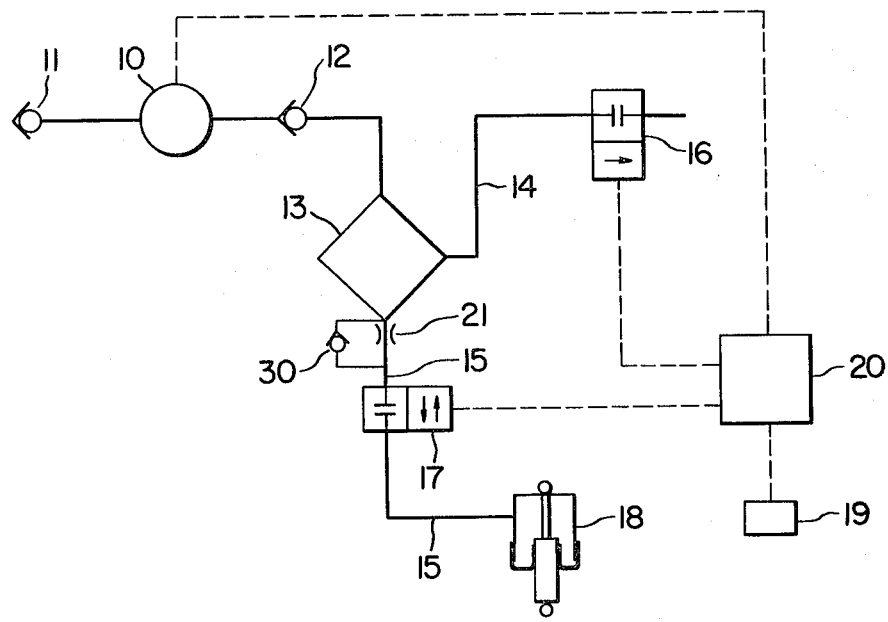
FIG. 1 is a pneumatic circuit showing an embodiment of a vehicle height control apparatus of the present invention.

Referring now to FIG. 1, there is shown a compressor 10 which is of the conventional reciprocating or rotary type. The compressor 10 is generally driven by an electric motor (not shown) to compress the air introduced through an intake valve 11. The intake valve 11, e.g., a check valve serves to prevent a reverse air flow. The compressed air is supplied to a drier 13 through discharge valve 12 e.g., also a check valve.

Figure 2:
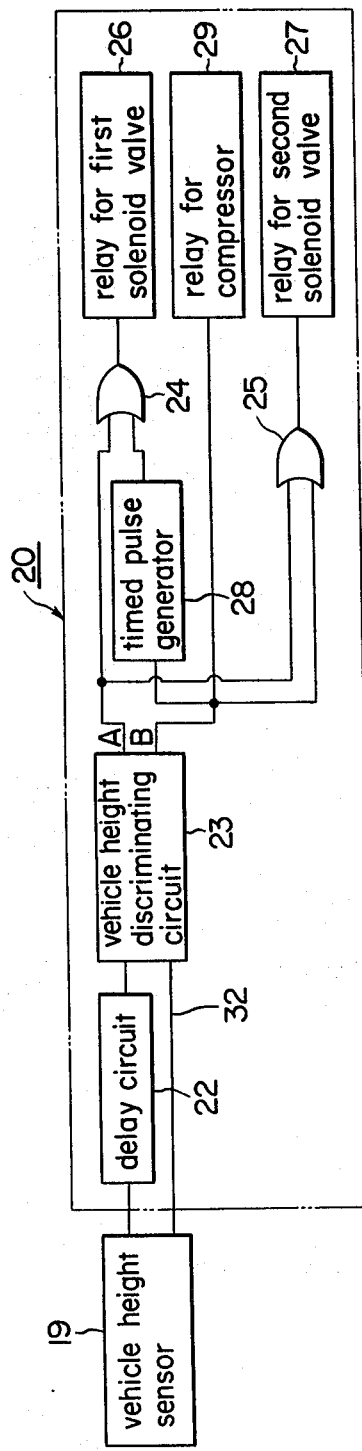
FIG. 2 is a schematic block diagram showing a control circuit which is incorporated in the vehicle height control apparatus.

The drier 13 per se is conventional one and serves to remove the moisture from the compressed air. Two passages 14 and 15 are connected with the drier 13. The exhaust passage 14 communicates the drier 13 with the atmosphere so that the air remained in the drier 13 is discharged to the atmosphere via a first solenoid valve 16 controlled by a control unit 20 shown in FIG. 2.

The passage 15 communicates the drier 13 with an absorber 18 having a pneumatic spring so that the compressed, dried air is supplied to the absorber 18 via a second solenoid valve 17. An orifice 21 which is disposed on the passage 14 between the drier 13 and the second solenoid valve 17. The inner diameter of the orifice 21 is so adjusted that the compressed air may be gradually discharged from the absorber 18. A steep lowering of the vehicle height is thus avoided. A check valve 30 provided in a by-pass passage by-passing the orifice 21 allows the air to flow from the drier 13 to absorbers 18, the check valve 30 and the by-pass passage being optionally provided.

The second solenoid valve 17 is controlled by the control unit 20 responsive to a vehicle height sensor 19.

The absorber 18 having a pneumatic spring may change its length by introducing and discharging the compressed air and may absorbs the shocks. Appropriate numbers of absorbers 18 are provided depending upon the vehicle's load although there is shown only one absorber 18 in FIG. 1.

A control unit generally indicated by a broken line 20 mainly comprises a vehicle height discriminating circuit 23 which receives via a delay circuit 22 signals from the vehicle height sensor 19 disposed at the suitable position of a vehicle body. The delay circuit 22 serves to reduce noises in signals from the sensor 19 caused by vehicle vibrations due to rough road for preventing chattering in the control apparatus. Optionally, there is provided a switching circuit (not shown) between the sensor 19 and the discriminating circuit 23, for alternatively shunting over the delay circuit 22 (operating at running) and a non-delay circuit 32 (operating at halt) between the sensor 19 and the circuit 23.

The height discriminating circuit 23 provides digital logic states at its two output terminals A and B in response to the signal representative of the vehicle height. For example the circuit 23 provides a digital state "0" at the both outputs A and B when the vehicle height is equal to a predetermined height. The circuit 23 provides logical states "1" and "0" at the outputs A and B, respectively, when the sensed height is higher than the predetermined height while is provides "0" and "1" at A and B respectively, when the height is lower than the predetermined height.

To the outputs A and B of the discriminating circuit 23 are connected a logic circuit comprising two OR gates 24 and 25 and a pulse generator 28. The first OR gate 24 has two inputs, one being connected to the output A of the circuit 23 and the other being connected to the output B of the circuit 23 via a timed pulse generator 28. The timed pulse generator 28 provides a logic "1" state at its output for a predetermined period of time after the logic state "1" has been changed to the state "0" at the output B of the circuit 23, namely, the predetermined height has been recovered from a low height.

There are provided a relay 26 for actuating the first solenoid valve 16, a relay 27 for actuating the second solenoid valve 17 and a relay 29 for actuating the compressor 29. The relay 26 is connected to the output of the first OR gate 24 so that it is energized when the output of the first OR gate 24 is at the logic state "1". The relay 27 is connected to the output of the second OR gate 25 so that it is energized when the output of the second OR gate is at the logic state "1". The relay 29 is connected to the output B of the circuit 23 so that it is energized when the output B is at "1".

In operation, when the vehicle height is lower than the predetermined height, the circuit 23 provides logic states "0" and "1" at the outputs A and B, respectively. The first OR gate 24 provides a logic state "0" at its output since no logic "1" is input on its inputs. The relay 26 is deenergized to close the first valve 16. The second OR gate provides logic "1" since logic "1" is presented from the output B of the circuit 23. The relay 27 is energized to open the second solenoid valve 17. The relay 29 is also energized to cause the motor of the compressor 10 to drive.

Accordingly the compressed air is supplied to the absorber 18 through the drier 13, a check valve 30 in the by-pass passage and the valve 17. The absorber 18 then extends to increase the height of the vehicle.

When the vehicle height gets a predetermined height both outputs A and B of the circuit 23 are at logic "0". The relay 29 is deenergized to stop the compressor 10. The relay 27 is also deenergized to close the second valve 17. The absorber 18 stops to extend so that the vehicle height is maintained at the predetermined height. As described above the timed pulse generator 28 provides a logic "1" to the input of the first OR gate for the predetermined period of time. The first OR gate 24 energizes the relay 26 to open the valve 16 to release the air remained in the drier 13 via the exhaust passage 14 to the atmosphere. The output terminal of the pulse generator 28 renders "0" to deenergize the firsrt relay 26 after the predetermined period of time has passed resulting in closing the first solenoid valve 16. The predetermined period of time is set so long that the residual compressed air in the drier 13 may be completely discharged.

When the height is higher than the predetermined height, the outputs A and b of the circuit 23 are at logic "1" and "0", respectively. The output of the first OR gate 24 is at "1" so that the relay 26 is energized to open the first solenoid valve 16. The output of the second OR gate 25 is also at "1" so that the relay 27 is energized to open the solenoid valve 17. Therelay 29 is deenergized to stop the compressor 10. Accordingly the excess air in the absorber 18 is released to atmosphere via the second valve 17, the orifice 21, the drier 13, the exhaust passage 14 and the first valve 16. The height of the vehicle is thus decreased until it reaches at the predetermined value. The orifice 21 provides a gradual release of air to prevent the vehicle from the abrupt decrease in the vehicle height.

On reaching the predetermined height, both the outputs A and B become "0" so that the relay 26 and 27 are deenergized to close the first and second valves, respectively.

The vehicle height control is repeated in such a manner described above that the vehicle height is maintained a predetermined height 1.

Many changes and modifications in the above embodiment of the invention can be made without departing from the scope of the invention. Accordingly, that scope is intended to be limited only by the scope of the appended claims.

What is claimed is:

1. In an apparatus for controlling the height of a vehicle including a compressor for compressing air; a drier communicated with the compressor for drying the compressed air and pneumatically springed shock absorbers communicated with the drier via valve means, said shock absorbers being adapted to change the height of the vehicle by introducing and discharging the compressed air in and from the shock absorbers, a controlling apparatus including:

(a) first valve means disposed in an exhaust passage communicating the drier with the atmosphere for opening and closing the exhaust passage;

(b) second valve means disposed in a passage communicating the absorbers with the drier for opening and closing the passage;

(c) sensor means for detecting the height of the vehicle;

(d) a control circuit connected to the output of the sensor means for selectively operating the compressor, the first and second valve means in response to the signals from the sensor means, said control circuit including a vehicle height discriminating circuit providing an output signal for opening or closing the respective first and second valve means and for controlling the compressor in relation to the signal from the sensor means relating to the relative vehicle height with respect to a predetermined height and a circuit sensing the recovery of the height from a low height to the predetermined height to provide a signal for opening the first valve means for a predetermined period of time; and, (e) the control circuit comprising the height discriminating circuit having a plurality of output terminals providing different combinations of logic state signals depending upon the output signal from the vehicle height sensor means, the circuit, coupled to one of the output terminals of the discriminating circuit, for sensing the recovery of the height from a low height to the predetermined height; and a logic circuit receiving output signals from the output terminals of the height discriminating circuit and the recovery sensing circuit and providing output signals to control the first and second valve means and the compressor.

2. The apparatus defined in claim 1, in which the height discriminating circuit has two output terminals providing logic state signals corresponding to low, high and the predetermined valves of the height, one of the outputs providing a signal respresentative of the low height being coupled through and OR gate to the input terminals of the recovery sensing circuit and a relay for energizing the compressor.

3. The apparatus defined in claim 2, in which the output terminal of the recovery sensing circuit and the other output terminal of the discriminating circuit are connected to an input terminal of an OR gate in the logic circuit, and an output terminal of the OR gate is connected to a relay controlling the first valve means.

4. The apparatus defined in claim 2 or 3, in which said control circuit further includes a second OR gate of the logic circuit having input terminals connected to the two output terminals of the discriminating circuit and having an output terminal connected to a relay controlling the second valve means.

5. The apparatus defined in claim 2 in which the circuit sensing the recovery of the height from the low to the predetermined height is a timed pulse generator which provides an output signal for a predetermined period of time.

6. The apparatus defined in claim 1 or 5, in which the predetermined period of time is a time interval sufficient to discharge the residual compressed air in the drier.

7. The apparatus defined in claims 1 or 5, further including an orifice disposed in the passage between the absorber and the drier.

8. The apparatus defined in claim 7, in which the inner diameter of the orifice means is so selected that the air is gradually discharged from the absorber.

9. The apparatus defined in claim 7, in which a by-pass passage having therein a check valve is provided by-passing the orifice.

10. The apparatus defined in claim 1, further including a circuit, between the vehicle height sensor means and the vehicle height discriminating circuit for removing noises due to vibrations of the vehicle.

11. The apparatus defined in claim 10, in which the noise removing circuit is a delay circuit.

* * * * *

UNITED STATES PATENT AND TRADEMARK OFFICE
CERTIFICATE OF CORRECTION

PATENT NO. : 4,465,297
DATED : August 14, 1984
INVENTOR(S) : Shinichi Yamahara

It is certified that error appears in the above-identified patent and that said Letters Patent is hereby corrected as shown below:

Column 6, line 3, "and" should read --an--.

Signed and Sealed this

Twelfth Day of March 1985

[SEAL]

Attest:

DONALD J. QUIGG

Attesting Officer     Acting Commissioner of Patents and Trademarks